(12) United States Patent
Totsuka et al.

(10) Patent No.: US 10,770,944 B2
(45) Date of Patent: Sep. 8, 2020

(54) ROTARY ELECTRIC MACHINE

(71) Applicant: Mitsubishi Electric Corporation, Tokyo (JP)

(72) Inventors: Fumitaka Totsuka, Tokyo (JP); Yuki Yamamoto, Tokyo (JP); Masaya Inoue, Tokyo (JP); Yoshiki Kuwahara, Tokyo (JP); Kota Katsuragi, Tokyo (JP); Ryuji Kitamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 67 days.

(21) Appl. No.: 16/105,077

(22) Filed: Aug. 20, 2018

(65) Prior Publication Data
US 2019/0356189 A1 Nov. 21, 2019

(30) Foreign Application Priority Data
May 18, 2018 (JP) .................. 2018-095863

(51) Int. Cl.
*H02K 3/52* (2006.01)
*H02K 3/50* (2006.01)
(Continued)

(52) U.S. Cl.
CPC .............. *H02K 3/38* (2013.01); *H02K 1/146* (2013.01); *H02K 3/18* (2013.01); *H02K 3/522* (2013.01);
(Continued)

(58) Field of Classification Search
CPC ............ H02K 1/146; H02K 3/18; H02K 3/28; H02K 3/50; H02K 3/522; H02K 2203/09; H02K 2203/12; H02K 2213/03
See application file for complete search history.

(56) References Cited

U.S. PATENT DOCUMENTS 7,034,419 B2 * 4/2006 Kabasawa .............. H02K 3/522
  310/260
7,557,478 B2 * 7/2009 Hoshika .................. H02K 3/522
  310/180
(Continued)

FOREIGN PATENT DOCUMENTS

JP    4847727 B2    12/2011
JP    2015-46959 A    3/2015
JP    6279122 B1    2/2018

OTHER PUBLICATIONS

Rejection Decision dated Nov. 26, 2019 from the Japanese Patent Office in application No. 2018-095863.
(Continued)

*Primary Examiner* — Burton S Mullins
(74) *Attorney, Agent, or Firm* — Sughrue Mion, PLLC; Richard C. Turner

(57) ABSTRACT

A plurality of bus rings, which are arranged at bus ring maintaining portions, include coil connecting portions, which are protruded in an outer direction in a shaft direction of a stator core with respect to the bus ring maintaining portions, and terminals of coils of a stator are bent in an outer direction in a diameter direction of the stator core in a state where end surfaces of wall portions of bobbins are used as base points, and are connected to the coil connecting portions of the bus rings, and the end surfaces of the wall portions are protruded in an outer direction in a shaft direction of the stator core with respect to end surfaces of the bus rings, and are positioned in an inner direction in a shaft direction of the stator core with respect to end surfaces of the coil connecting portions of the bus rings.

8 Claims, 9 Drawing Sheets

(51) Int. Cl.
*H02K 1/14* (2006.01)
*H02K 3/28* (2006.01)
*H02K 3/38* (2006.01)
*H02K 3/18* (2006.01)

(52) U.S. Cl.
CPC ..... *H02K 2203/09* (2013.01); *H02K 2203/12* (2013.01); *H02K 2213/03* (2013.01)

(56) References Cited

U.S. PATENT DOCUMENTS

| | | | |
|---|---|---|---|
| 2006/0043806 A1* | 3/2006 | Torii | H02K 3/522 |
| | | | 310/71 |
| 2015/0061430 A1 | 3/2015 | Egami et al. | |
| 2015/0137634 A1* | 5/2015 | Kurita | H02K 3/28 |
| | | | 310/71 |

OTHER PUBLICATIONS

Communication dated Jun. 25, 2019 from Japanese Patent Office in counterpart JP Application No. 2018-095863.

* cited by examiner

ROTARY ELECTRIC MACHINE

BACKGROUND OF THE INVENTION

Field of the Invention

The present application relates to a rotary electric machine such as a generator, an electric motor, or an electric generator.

Explanation of a Related Art

In a conventional rotary electric machine, bobbins, which are made of a resin, are provided at each of separated cores, and a U-phase coil, a V-phase coil, and a W-phase coil are wound around coil winding portions of each of the bobbins, and each of the U-phase coil, a V-phase coil, and a W-phase coil is respectively connected to three bus rings, and a common side of each of the coils is connected to a neutral bus ring, whereby each of the coils is connected in a star connection state. Moreover, each of the bus rings is formed in a plane plate shape, and is inserted to and maintained by each of bus ring maintaining portions having a ditch shape, which are provided at each of the bobbins. A portion, which is poisoned along a circumference direction of each of the bus rings, is protruded in a shaft direction and is used as a coil connecting portion, and each of the coils is connected to the coil connecting portion of each of the bus rings. All separated cores and the bobbins are arranged in an annular shape, and are fitted to an inner circumference of a yoke (for example, refer to Patent Document 1).
[Patent Document 1]
Japanese Patent Publication No. 4847727

In the rotary electric machine which is described in Patent Document 1, a bend base point, by which the terminals of the coils are formed in an outer direction in a diameter direction, does not exist at a bobbin, so that space, in which a tool for forming the terminals is stored, is required, and the rotary electric machine is upsized. Moreover, when the terminals of the coils, which are extended in a shaft direction of the coils, are inclined in outer direction in a diameter direction of the coils, a distance between the terminals and a different-phase bus ring, which is positioned at an inner direction side in a diameter direction of the coils, is shortened, and an insulation distance cannot be maintained.

SUMMARY OF THE INVENTION

The present application has been made to disclose a technology by which the above-described problems are solved, and an object of the present application is to obtain a small rotary electric machine while an insulation capability between terminals of coils and bus rings is maintained.

A rotary electric machine, which is disclosed in the present application includes a stator core which includes core back portions having an arc shape, and teeth which are protruded from an inner circumference wall surface of the core back portions to an inner direction in a diameter direction of the core back portions; a stator which includes bobbins having an electric insulation capability, which are arranged at both end surfaces in a shaft direction of the stator core, and coils which are wound around the teeth via the bobbins; and a rotor which is coaxially arranged at an inner circumference of the stator; wherein the bobbins include coil winding portions, which are arranged at end surfaces in a shaft direction of the teeth, on which the coils are wound; flange portions, which are arranged at end surfaces in a shaft direction of the core back portions, at which a plurality of bus ring maintaining portions are separately formed in a diameter direction of the core back portions, in a state where a ditch depth direction is set as a shaft direction of the core back portions, and a ditch direction is set as a circumference direction of the core back portion; and wall portions which are arranged in an inner direction in a diameter direction of the core back portions at the bus ring maintaining portions, and a plurality of bus rings, which are concentrically arranged at the bus ring maintaining portions, include coil connecting portions which are protruded in an outer direction in a shaft direction of the stator core with respect to the bus ring maintaining portions, and terminals of the coils are bent in an outer direction in a diameter direction of the stator core, in a state where end surfaces of the wall portions are used as base points, and are connected to the coil connecting portions of the bus rings, which are connection objects, and the end surfaces of the wall portions are protruded in an outer direction in a shaft direction of the stator core with respect to end surfaces of the bus rings, and are positioned in an inner direction in a shaft direction of the stator core with respect to end surfaces of the coil connecting portions.

According to the rotary electric machine which is disclosed in the present application, the wall portions of the bobbins can be used as the bend base points of the terminals of the coils, in a state where the wall portions of the bobbins are used as the base points, so that a special tool is not required, and a cost of equipment can be reduced, and a process can be easily performed. Moreover, space, in which a tool, which is used as a bend base point, is stored, is not required, so that the rotary electric machine can be down sized. Moreover, a height of the wall portions of the bobbins is higher than a height of the end surfaces of the bus rings, so that an air insulation distance between the wall portions of the bobbins, which are bent in a state where the wall portions are used as the base points, and the bus rings can be maintained. Moreover, a height of the wall portions of the bobbins is higher than a height of the end surfaces of the bus rings, so that a creepage distance from portions, which are contacted to the wall portions of the terminals of the coils, to the bus rings can be increased, and an insulation capability is improved.

DETAILED EXPLANATION FOR THE INVENTION

Embodiment 1

Figure 1:
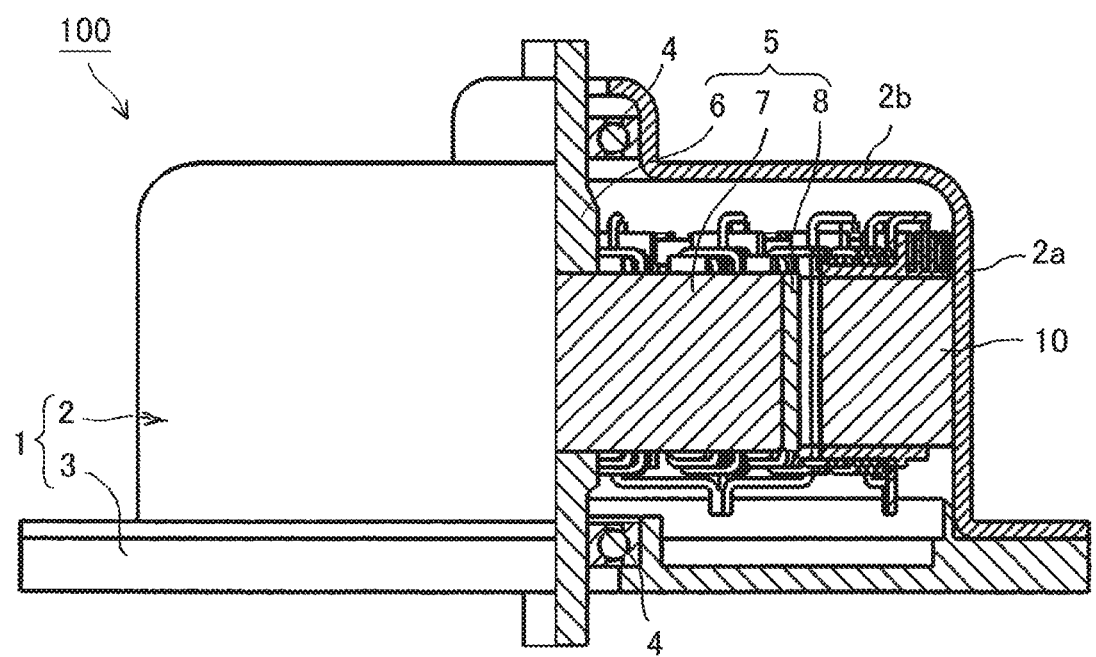
FIG. 1 is a one-side cross-sectional view which indicates a rotary electric machine according to Embodiment 1.
Figure 2:
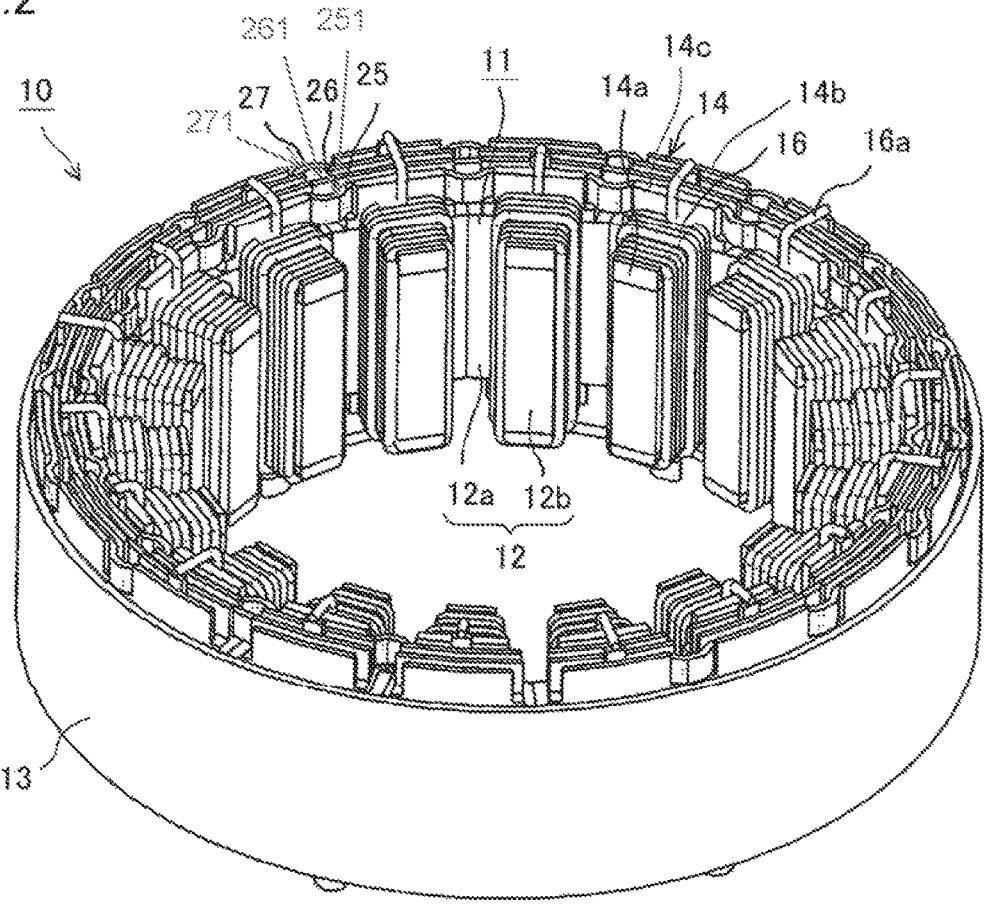
FIG. 2 is an oblique perspective view in which a stator of the rotary electric machine according to Embodiment 1 is viewed from one end side in a shaft direction.
Figure 3:
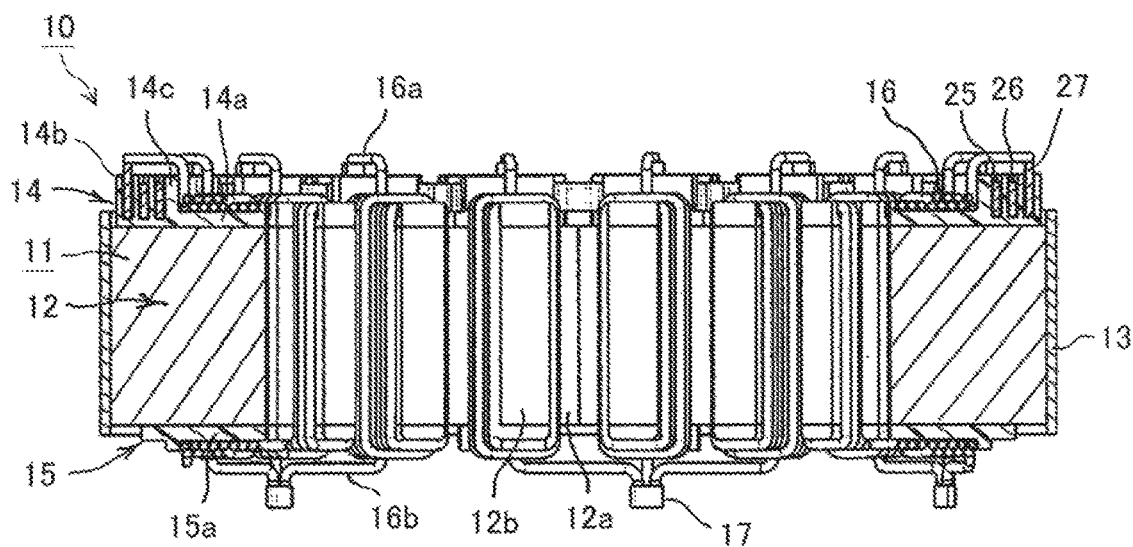
FIG. 3 is a cross-sectional view which indicates the stator of the rotary electric machine according to Embodiment 1.
Figure 4:
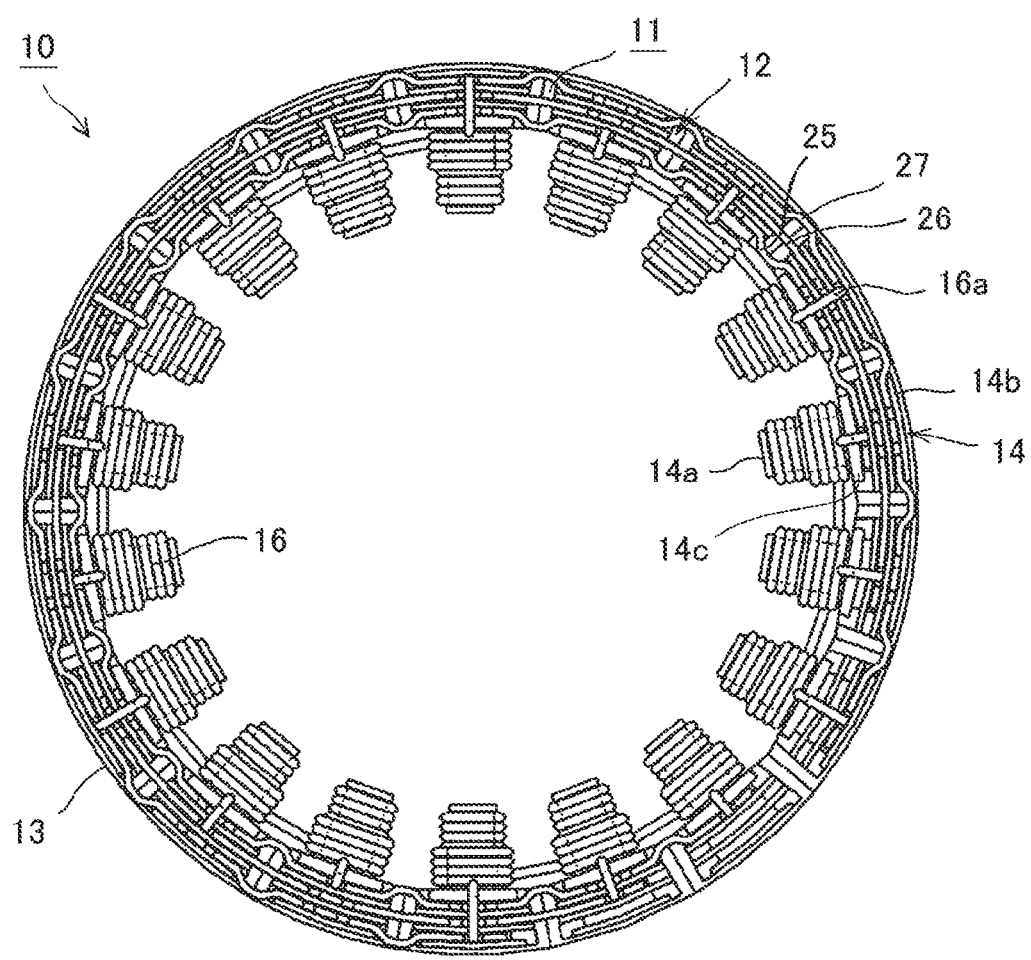
FIG. 4 is an end surface view in which the stator of the rotary electric machine according to Embodiment 1 is viewed from one end side in a shaft direction.
Figure 5:
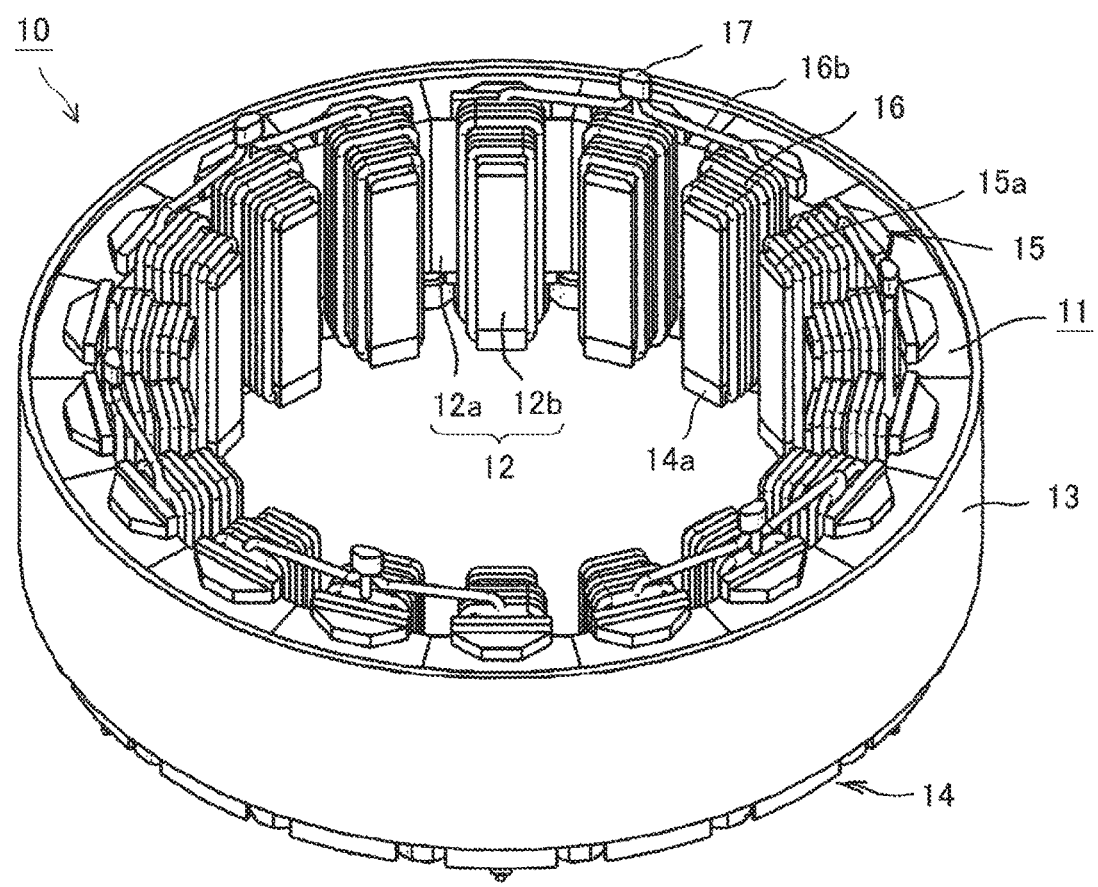
FIG. 5 is an oblique perspective view in which the stator of the rotary electric machine according to Embodiment 1 is viewed from the other end side in a shaft direction.
Figure 6:
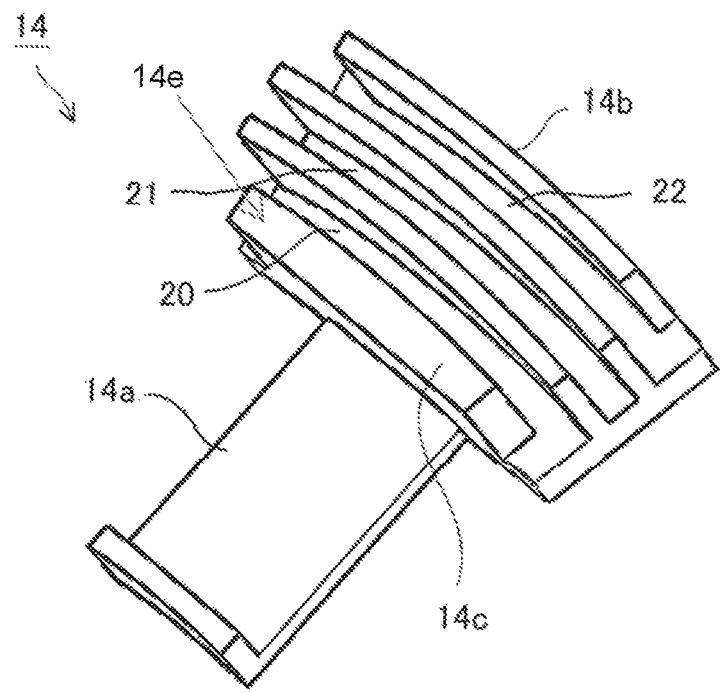
FIG. 6 is an oblique perspective view which indicates a bobbin which is applied to the stator of the rotary electric machine according to Embodiment 1.
Figure 7:
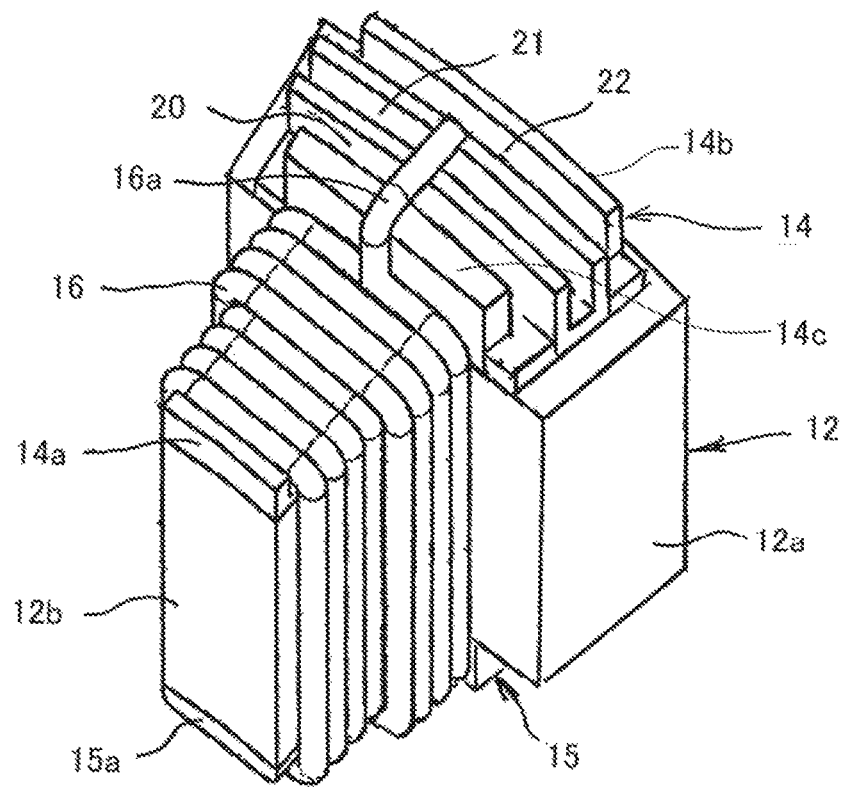
FIG. 7 is an oblique perspective view which indicates a separated core, on which a coil is wound, at the stator of the rotary electric machine according to Embodiment 1.
Figure 8:
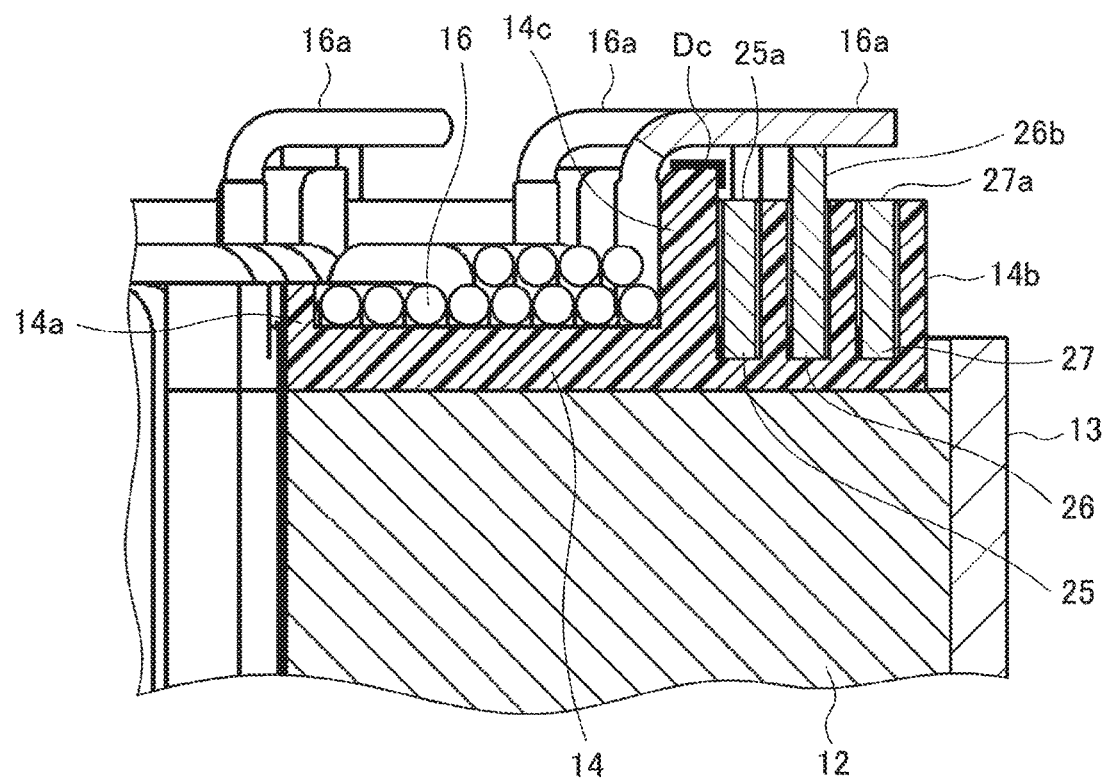
FIG. 8 is a cross-sectional view of a main portion, which indicates the stator of the rotary electric machine according to Embodiment 1.

FIG. 1 is a one-side cross-sectional view which indicates a rotary electric machine according to Embodiment 1. FIG. 2 is an oblique perspective view in which a stator of the rotary electric machine is viewed from one end side in a shaft direction. FIG. 3 is a cross-sectional view which indicates the stator of the rotary electric machine. FIG. 4 is an end surface view in which the stator of the rotary electric machine is viewed from one end side in a shaft direction. FIG. 5 is an oblique perspective view in which the stator of the rotary electric machine is viewed from the other end side in a shaft direction. FIG. 6 is an oblique perspective view which indicates a bobbin which is applied to the stator of the rotary electric machine. FIG. 7 is an oblique perspective view which indicates a separated core, on which a coil is wound, at the stator of the rotary electric machine. FIG. 8 is a cross-sectional view of a main portion, which indicates a connecting portion for terminals of coils of the stator of the stator and bus rings.

In FIG. 1, a rotary electric machine 100 includes a housing 1 which includes a frame 2 made of an aluminum material or the like, which is composed of a cylinder portion 2a and a bottom portion 2b and is configured in a cylinder shape having a bottom, and an end plate 3 by which an aperture of the flame 2 is closed; a stator 10 which is inserted into the cylinder portion 2a of the frame 2 so as to be fixed; and a rotor 5 which is fixed to a rotary shaft 6, which is rotatably supported to the bottom portion 2b of the frame 2 and the end plate 3 via a bearing 4, and is rotatably arranged at an inner circumference side of the stator 10.

The rotor 5 is a permanent magnet-type rotor which includes a rotor core 7 which is fixed to the rotary shaft 6 which is inserted at a position of a shaft center; and permanent magnets 8 which are buried at an outer circumference surface side of the rotor core 7 and are arranged, in a circumference direction, with a predetermined pitch, in a state where the permanent magnets 8 compose a magnetic pole. In addition, the rotor 5 is not limited to a permanent magnet-type rotor, and it is suitable that a squirrel-cage type rotor, in which a rotor conductor, which is not insulated, is installed in a slot of a rotor core and both sides are shorted by using a short circle, is used, or a winding-type rotor, in which a conductive wire, which is insulated, is mounted at a slot of a rotor core, is used.

Hereinafter, a configuration of the stator 10 will be specifically explained in reference to FIG. 2 through FIG. 7.

The stator 10 includes a stator core 11 in which separated cores 12 are arranged in an annular shape; a U-phase coil 16, a V-phase coil 16, and a W-phase coil 16, which are wound around each of the separated cores 12 via a bobbin 14 and a bobbin 15; and a U-phase bus ring 25, a V-phase bus ring 26, and a W-phase bus ring 27, which are adjacently arranged and which have end surfaces 251, 261, and 271, respectively, by which the U-phase coil 16, the V-phase coil 16, and the W-phase coil 16 are connected.

The separated cores 12 are formed in such a way that the stator core 11 having an annular shape is separated into 18 equal parts in a circumference direction and a predetermined number of magnetic steel sheets are laminated and integrated, and the separated cores 12 include core back portions 12a, of which cross section has an arc shape, and teeth 12b which are protruded from inner circumference wall surfaces of the core back portions 12a to an inner direction in a diameter direction of the core back portions 12a.

As indicated in FIG. 6, the bobbin 14 is made of a resin material, such as a PBT resin or a PPS resin, and has an electric insulation capability, and includes a coil winding portion 14a; a flange portion 14b which is provided at an outer diameter side of the coil winding portion 14a; and a wall portion 14c having an end surface 14e and which is arranged in an inner direction in a diameter direction of the core back portions 12a at a bus ring maintaining portion 20, a bus ring maintaining portion 21, and a bus ring maintaining portion 22. The bobbin 14 is arranged on one end surface in a shaft direction of the separated cores 12. In this case, as indicated in FIG. 3 and FIG. 4, the coil winding portion 14a is arranged on one end surface in a shaft direction of the teeth 12b, and the flange portion 14b is arranged on one end surface in a shaft direction of the core back portions 12a. The bus ring maintaining portion 20, the bus ring maintaining portion 21, and the bus ring maintaining portion 22, which have a ditch shape, are formed in a concentric shape at the flange portion 14b.

Moreover, the bobbin 15 is made of a resin material, such as a PBT resin or a PPS resin, and a coil winding portion 15a is provided at the bobbin 15. The bobbin 15 is arranged on the other end surface in a shaft direction of the separated cores 12. In this case, as indicated in FIG. 3 and FIG. 7, the coil winding portion 15a is arranged on the other end surface in a shaft direction of the teeth 12b.

In addition, it is suitable that the bobbin 14 and the bobbin 15 are fixed to the separated cores 12 from a viewpoint of an easy winding operation of the coils 16. For example, it is suitable that the bobbin 14 and the bobbin 15 are fixed to the separated cores 12 by using a fitting operation, or it is suitable that the bobbin 14 and the bobbin 15 are fixed to the separated cores 12 by using an adhesive material or the like. Moreover, it is suitable that the bobbin 14 and the bobbin 15 are integrally molded and formed at the separated cores 12.

As indicated in FIG. 7, the coils 16 are configured in such a way that a conductive wire, which is composed of a round copper wire on which an insulating film is coated, is wound, with a predetermined number, around the teeth 12b, and the coil winding portion 14a and the coil winding portion 15a of the bobbin 14 and the bobbin 15, which are arranged at both end surfaces in a shaft direction of the teeth 12b. In addition, insulators (not illustrated) are arranged at both side surfaces in a circumference direction of the teeth 12b, whereby an insulation capability between the coils 16 and the separated cores 12 is maintained.

As indicated in FIG. 2 through FIG. 5, the separated cores 12, of which number is 18, on which the coils 16 are wound, are inserted and fixed, by using a press-inserting method, a burn-fitting method or the like, to the inside of a yoke 13 having a cylinder shape, in a state where the teeth 12b are faced toward an inner direction in a diameter direction, and side surfaces in a circumference direction of the core back portions 12a are faced to each other so as to be arranged in an annular shape. Although the yoke 13 is formed by shaving and processing or by squeezing and processing a single metal material, it is suitable that the yoke 13 is formed by laminating and integrating a steel sheet such as magnetic steel sheet.

The coils 16, which are wound around the separated cores 12 so as to be arranged in an annular shape, are repeated and arranged, in a sequence of a U-phase coil 16, a V-phase coil 16, and a W-phase coil 16, in a circumference direction of the stator core 11. One terminal 16a of each of the coils 16 is led toward the bobbin 14 side. Moreover, the other terminal 16b of each of the coils 16 is led toward the bobbin 15 side.

Each of the U-phase bus ring 25, the V-phase bus ring 26, and the W-phase bus ring 27 is configured in such a way that a plane sheet having a band shape, such as an oxygen-free copper, a de-oxidation copper, or a tough pitch copper, is bent and formed in a cylinder shape in which a part is opened. As indicated in FIG. 2 and FIG. 4, the U-phase bus ring 25, the V-phase bus ring 26, and the W-phase bus ring 27 are respectively fitted to the bus ring maintaining portion 20, the bus ring maintaining portion 21, and the bus ring maintaining portion 22, which are indicated in FIG. 6, and are fixed by using an adhesive material or the like in accordance with a requirement, whereby the U-phase bus ring 25, the V-phase bus ring 26, and the W-phase bus ring 27 are maintained to the bus ring maintaining portion 20, the bus ring maintaining portion 21, and the bus ring maintaining portion 22.

As indicated in FIG. 2 and FIG. 4, the terminal 16a of the U-phase coil 16 is led toward the bobbin 14 side in a shaft direction, and is led in an outer direction in a diameter direction of the stator core 11 in a state where the terminal 16a is bent at a right angle, whereby the terminal 16a is connected to a coil connecting portion of the U-phase bus ring 25. The terminal 16a of the V-phase coil 16 is led toward the bobbin 14 side in a shaft direction, and is led in an outer direction in a diameter direction of the stator core 11 in a state where the terminal 16a is bent at a right angle, whereby the terminal 16a is connected to a coil connecting portion of the V-phase bus ring 26. The terminal 16a of the W-phase coil 16 is led toward the bobbin 14 side in a shaft direction, and is led in an outer direction in a diameter direction of the stator core 11 in a state where the terminal 16a is bent at a right angle, whereby the terminal 16a is connected to a coil connecting portion of the W-phase bus ring 27. In this case, the terminals 16a of the U-phase coil 16, the V-phase coil 16, and the W-phase coil 16 are electrically connected, to the coil connecting portions of the bus ring 25, the bus ring 26, and bus ring 27, by using a TIG welding method, a laser welding method, a resistor welding method, a soldering method, a resistor brazing method or the like.

As indicated in FIG. 5, the terminals 16b of the U-phase coil 16, the V-phase coil 16, and W-phase coil 16, in other words, the terminals 16b at a common side are led toward a bobbin 15 side in a shaft direction so as to be integrated, and are electrically connected by using a TIG welding method, a laser welding method or the like. A connecting portion at a common side of the U-phase coil 16, the V-phase coil 16, and W-phase coil 16 is coated by using an insulating tube 17. In addition, it is suitable that the connecting portion at the common side is coated by using a resin mold, an insulating tape or the like, instead of the insulating tube 17. Moreover, although the connecting portion at the common side is integrated and connected by using a welding method, it is suitable that a bus ring maintaining portion for a common is formed at the bobbin 15, and a common side of the U-phase coil 16, the V-phase coil 16, and W-phase coil 16 is connected to a bus ring for a common, which is maintained by the bus ring maintaining portion.

In the stator 10 which is configured as described above, three-phase AC windings, of which number is 6, in which the U-phase coil 16, the V-phase coil 16, and W-phase coil 16 are respectively formed in a Y connection state, are configured.

In the rotary electric machine 100, an AC electric current is supplied to the U-phase bus ring 25, the V-phase bus ring 26, and the W-phase bus ring 27 via an inverter (not illustrated) at the outside. Thereby, a rotary magnetic field is generated at the stator 10. The rotor 5 is rotated and driven in accordance with a suction force or a repulsion force, which is caused by the rotary magnetic field. The rotary electric machine 100 can be applied to an electric motor such as a motor which is mounted in a household electric appliance, or a motor which is mounted in an industrial machine.

In FIG. 8, the terminals 16a of the coils 16 are bent in an outer direction in a diameter direction in a state where an end portion of the wall portion 14c of the bobbin 14 is used as a base point, and is connected to a coil connecting portion 26b of the bus ring 26. The end surface of the wall portion 14c of the bobbin 14 is protruded in an outer direction in a shaft direction with respect to the end surfaces of the bus ring 25, the bus ring 26, and bus ring 27, and the wall portion 14c of the bobbin 14 is positioned in an inner direction in a shaft direction with respect to the end surface of the coil connecting portion 26b of the bus ring 26.

As described above, in the rotary electric machine 100 according to Embodiment 1, the bobbins include the coil winding portions, which are arranged at end surfaces in a shaft direction of the teeth, on which the coils are wound; the flange portions, which are arranged at end surfaces in a shaft direction of the core back portions, at which a plurality of bus ring maintaining portions are separately formed in a diameter direction of the core back portions, in a state where a ditch depth direction is set as a shaft direction of the core back portions, and a ditch direction is set as a circumference direction of the core back portion; and the wall portions which are arranged in an inner direction in a diameter direction of the core back portions in the bus ring maintaining portions, and a plurality of the bus rings, which are concentrically arranged at the bus ring maintaining portions, include the coil connecting portions which are protruded in an outer direction in a shaft direction of the stator core with respect to the bus ring maintaining portions, and the terminals of the coils are bent in an outer direction in a diameter direction of the stator core, in a state where the end surfaces of the wall portions are used as base points, and are connected to the coil connecting portions of the bus rings, which are connection objects, and the end surfaces of the wall portions are protruded in an outer direction in a shaft direction of the stator core with respect to the end surfaces of the bus rings, and are positioned in an inner direction in the shaft direction of the stator core with respect to the end surfaces the coil connecting portions.

In the rotary electric machine 100 according to Embodiment 1, effects, which are described in the following descriptions, are obtained.

(1) The wall portions of the bobbins can be used as bend base points of the terminals of the coils, in a state where the wall portions of the bobbins are used as base points, and a private and special tool is not required, so that a cost of equipment can be reduced, and a process can be easily performed.

(2) Space, in which a tool, which is used as a bend base point, is stored, is not required, so that the rotary electric machine can be down sized.

(3) The end surfaces of the wall portions of the bobbins are protruded in an outer direction in a shaft direction with respect to the end surfaces of the bus rings, whereby an air insulation distance between the terminals, which are bent in a state where the wall portions of the bobbins are used as base points, and the bus ring of the other phase can be maintained.

(4) The end surfaces of the wall portions of the bobbins are protruded in an outer direction in a shaft direction with respect to the end surfaces of the bus rings, whereby a creepage distance Dc (refer to FIG. 8) from a portion, which is contacted to the wall portions of the terminals of the coils, to the bus rings can be increased, and an insulation capability can be improved.

Embodiment 2

Figure 9A:
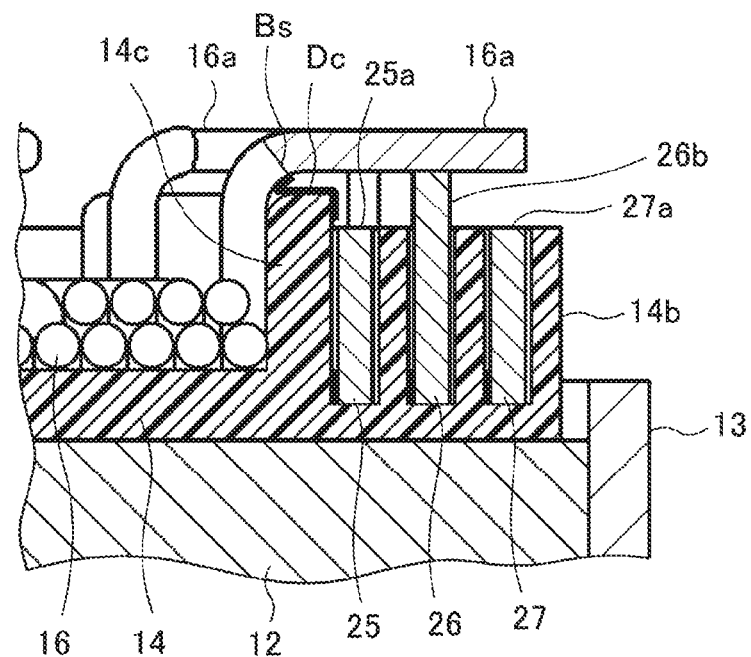
FIG. 9A and FIG. 9B are cross-sectional views of main portions, which indicate a stator of a rotary electric machine according to Embodiment 2.
Figure 9B:
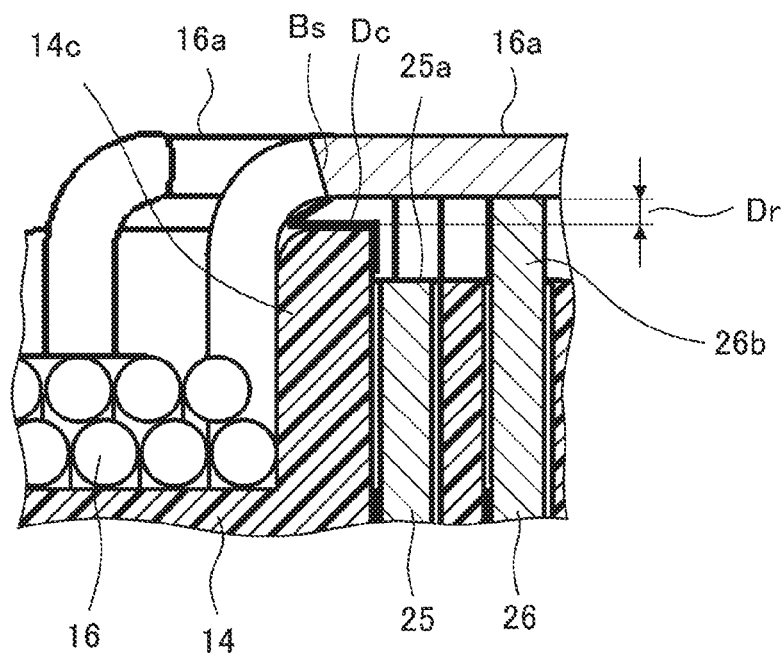

FIG. 9A and FIG. 9B are cross-sectional views of main portions, which indicate a stator of a rotary electric machine according to Embodiment 2. FIG. 9A is a cross-sectional view of a main portion, which indicates a connection portion 26b between terminals 16a of coils 16 of a stator 10 and a bus ring 25, a bus ring 26, and a bus ring 27, and FIG. 9B is a cross-sectional view in which the main portion in FIG. 9A are enlarged.

In FIG. 9A and FIG. 9B, the terminals 16a of the coils 16 are bent in an outer direction in a diameter direction, in a state where an end portion of a wall portion 14c of a bobbin 14 is used as a base point, and is connected to the coil connecting portion 26b of the bus ring 26. A boundary Bs of a film exfoliation of each of the terminals 16a of the coils 16 is positioned in an outer direction in a shaft direction with respect to an end surface of the wall portion 14c of the bobbin 14. Moreover, it is suitable that a creepage distance Dc, by which a passage of a creepage is not bridged, between the boundary Bs of the film exfoliation and the end surface of the wall portion 14c is maintained. For example, when a required space distance Dr, by which a passage of a creepage is not bridged, is shorter than 3 mm and a pollution degree is 3, a required creepage distance Dc is longer than or equal to 0.5 mm (in reference to "IEC standard: IEC60664-1: 2007").

As described above, in the rotary electric machine 100 according to Embodiment 2, the boundary Bs of the film exfoliation of each of the terminals 16a of the coils 16 is positioned in an outer direction in a shaft direction of a stator core 11 with respect to the end surface of the wall portion 14c of the bobbin 14.

In the rotary electric machine 100 according to Embodiment 2, effects, which are described in the following descriptions, are obtained.

(1) It can be set that the creepage distance Dc according to Embodiment 2 is longer than the creepage distance Dc according to Embodiment 1, so that an insulation capability is more improved.

(2) A film is provided at a portion which is used as a bend base point of each of the terminals 16a of the coils 16, so that a broken wire, which is caused by a vibration, of the terminals 16a can be prevented.

Embodiment 3

Figure 10:
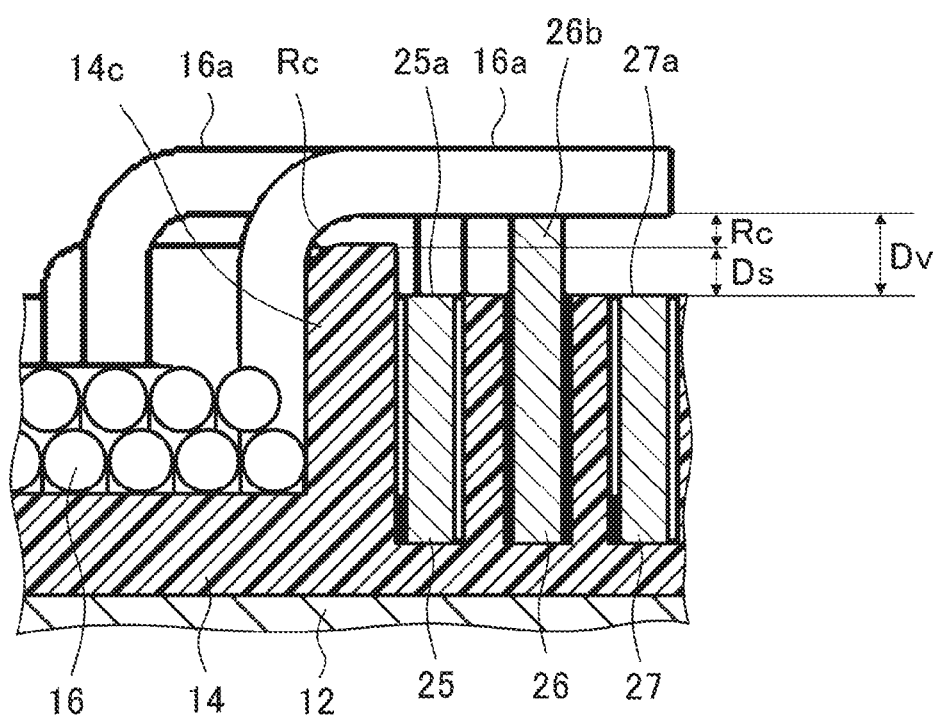
FIG. 10 is a cross-sectional view of a main portion, which indicates a stator of a rotary electric machine according to Embodiment 3.

FIG. 10 is a cross-sectional view of a main portion, which indicates a stator of a rotary electric machine according to Embodiment 3, and FIG. 10 is a cross-sectional view in which a connection portion between terminals 16a of coils 16 of a stator 10 and a bus ring 25, a bus ring 26, and a bus ring 27 is enlarged.

In FIG. 10, the terminals 16a of the coils 16 are bent in an outer direction in a shaft direction in a state where an end portion of a wall portion 14c of a bobbin 14 is used as a base point, and is connected to a coil connecting portion 26b of the bus ring 26. An end surface of the wall portion 14c of the bobbin 14 is positioned in an outer direction in a shaft direction with respect to end surfaces of the bus ring 25, the bus ring 26, and the bus ring 27. When a bend radius of the terminals 16a of the coils 16 is set as an Rc, and a required air distance for an insulation capability in other words, an air distance, by which an insulation capability between the terminals 16a of the coils 16 and the other (the other phases) bus ring 25 and bus ring 26, which are different from the bus ring 26 to which the terminals 16a of the coils 16 are connected, is maintained, is set as an Dv, a distance Ds in a shaft direction between the end surface of the wall portion 14c of the bobbin 14 and the end surfaces of the bus ring 25 and the bus ring 27 is set as the following formula.

$Ds \geq Dv-Rc$

A required air distance Dv is different in accordance with a voltage. In other words, an air distance Dv, by which the rotary electric machine 100 endures a constant state voltage, a temporary over voltage, or a repeated peak voltage, is defined. For example, when a peak value of a voltage is 2 kV, the required air distance Dv is longer than or equal to 1.27 mm ("IEC standard: IEC60664-1: 2007"). When the bend radius Rc of the terminals 16a is a 0.5 mm, it is required that the distance Ds, in a shaft direction, between the end surface of the wall portion 14c of the bobbin 14 and the end surfaces of the bus ring 25 and the bus ring 27 is longer than or equal to 0.77 mm.

As described above, in the rotary electric machine 100 according to Embodiment 3, when a bend radius of the terminals 16a of the coils 16 is set as the Rc, and an air distance, by which an insulation capability between the terminals 16a of the coils 16 and the other bus ring 25 and bus ring 26, which are different from the bus ring 26 to which the terminals 16a of the coils 16 are connected, is maintained, is set as the Dv, the distance Ds in a shaft direction between the end surface of the wall portion 14c of the bobbin 14 and the end surfaces of the bus ring 25 and the bus ring 27 is set as the following formula.

$Ds \geq Dv-Rc$

In the rotary electric machine 100 according to Embodiment 3, effects, which are described in the following descriptions, are obtained.

(1) A distance between the terminals 16a of the coils 16 and the bus rings is set as a minimum required distance, so that the rotary electric machine 100 can be downsized.

(2) A passage of the terminals 16a of the coils 16 is shortened, so that the terminals 16a are not easily vibrated, and a resistance capability to a vibration is improved.

Embodiment 4

Figure 11:
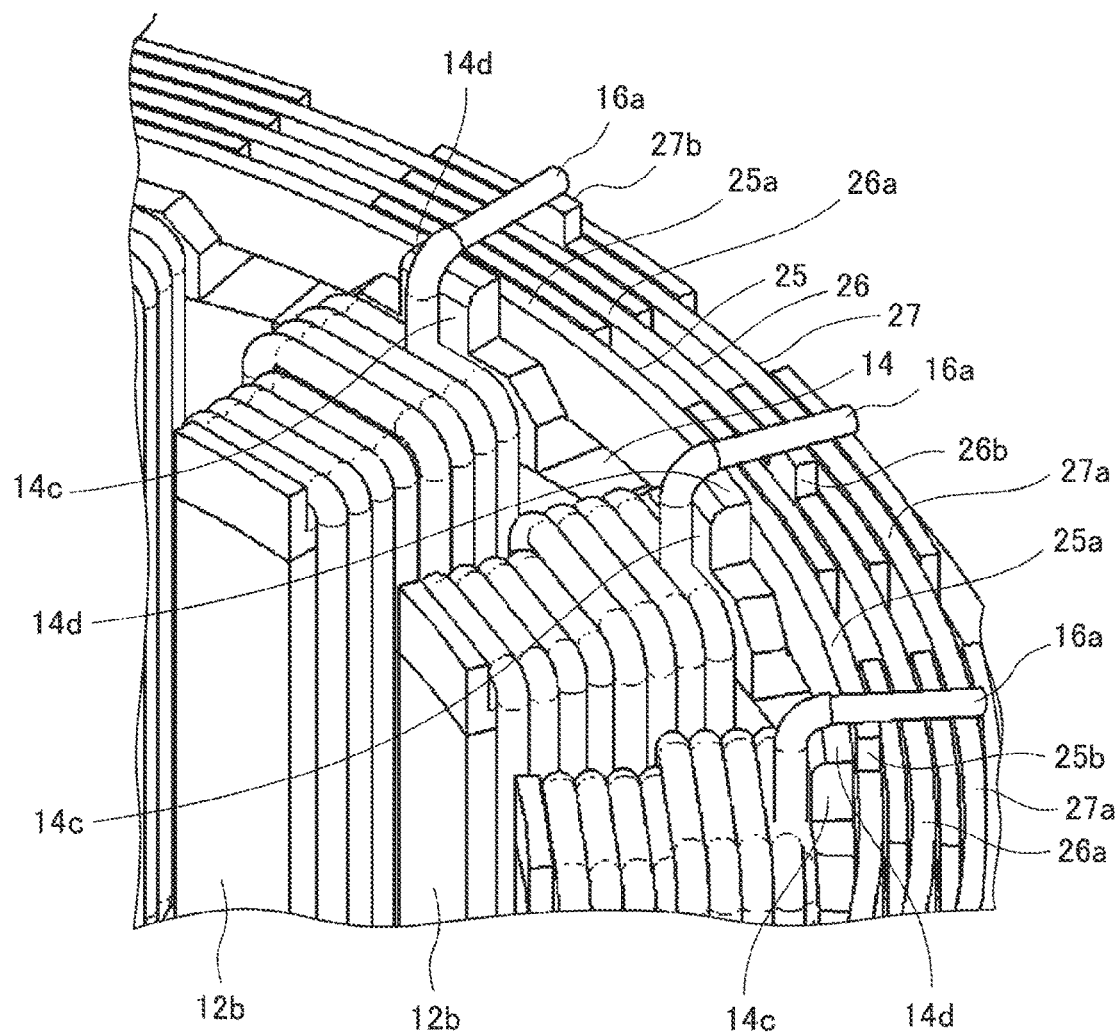
FIG. 11 is an oblique perspective view of a main portion, which indicates a stator of a rotary electric machine according to Embodiment 4.

FIG. 11 is an oblique perspective view of a main portion, which indicates a stator of a rotary electric machine according to Embodiment 4.

In FIG. 11, each of a bus ring 25, a bus ring 26, a bus ring 27, is inserted into a bobbin 14 which is attached to a core. Moreover, protruding portions 14d, at which only wall portions 14c of portions, which are used as bend base points of terminals 16a of coils 16, are protruded in a shaft direction, are formed. Thereby, the bus ring 25 is exposed between adjacent wall portions 14c. In addition, a bus ring end portion 25a and a coil connecting portion 25b are included at the bus ring 25, and a bus ring end portion 26a and a coil connecting portion 26b are included at the bus ring 26, and a bus ring end portion 27a and a coil connecting portion 27b are included at the bus ring 27.

As described above, in the rotary electric machine 100 according to Embodiment 4, the protruding portions 14d, which are faced to the portions, which are used as the bend base points of the terminals 16a of the coils 16, and are protruded in a shaft direction of the stator core 11, are included at the wall portions 14c of the bobbin 14.

In the rotary electric machine 100 according to Embodiment 4, effects, which are described in the following descriptions, are obtained.

(1) The exposed portions of the bus ring 25, the bus ring 26, and the bus ring 27, which are arranged in an inner direction in a diameter direction of the stator core 11, are increased, whereby a radiation capability is improved, and a capability of the rotary electric machine 100 is improved.

(2) A material, which is used for an area except for areas which are contacted to the terminals 16a of the coils 16, can be reduced, so that a cost can be reduced.

In the present application, although various and exemplary embodiments and working examples are described, various characteristics, modes, and functions, which are described in one or a plurality of embodiments, are not limited to an applicability of a specific embodiment, and can be applied to the embodiments in a single state or in various combination states.

Therefore, countless deformation examples, which are not exemplified, are assumed in a field of a technology which is disclosed in the specification of the present application. For example, it is assumed that a case in which at least one of components is deformed, and a case in which at least one of components is added, or a case in which at least one of components is omitted, and moreover, a case in which at least one of components is extracted and combined to a component of the other embodiment, are included.

What is claimed is:

1. A rotary electric machine comprising:
a stator core which includes core back portions having an arc shape, and teeth which protrude from inner circumference wall surfaces of the core back portions to an inner direction in a diameter direction of the core back portions;
a stator which includes bobbins having an electric insulation capability, which are arranged at both end surfaces in a shaft direction of the stator core, and coils which are wound around the teeth via the bobbins; and
a rotor which is coaxially arranged at an inner circumference of the stator;
wherein the bobbins include coil winding portions, which are arranged at end surfaces in a shaft direction of the teeth, on which the coils are wound; flange portions, which are arranged at end surfaces in a shaft direction of the core back portions, at which a plurality of bus ring maintaining portions are separately formed in a diameter direction of the core back portions, each of the plurality of bus ring maintaining portions extending in the shaft direction and a circumference direction of the core back portions; and wall portions which are arranged in an inner direction in a diameter direction of the core back portions at the bus ring maintaining portions,
wherein a plurality of bus rings, which are concentrically arranged at the bus ring maintaining portions, include coil connecting portions which protrude in an outer direction in a shaft direction of the stator core with respect to the bus ring maintaining portions,
wherein terminals of the coils are bent in an outer direction in a diameter direction of the stator core at positions of end surfaces of the wall portions, and are connected to the coil connecting portions of the bus rings,
wherein the end surfaces of the wall portions protrude in an outer direction in a shaft direction of the stator core with respect to end surfaces of the bus rings, and are positioned in an inner direction in a shaft direction of the stator core with respect to end surfaces of the coil connecting portions, and
wherein the terminals of the coils are separated from the end surfaces of the wall portions.

2. A rotary electric machine as recited in claim 1, wherein the wall portions comprise protruding portions, about which the terminals of the coils are bent.

3. A rotary electric machine comprising:
a stator core which includes core back portions having an arc shape, and teeth which protrude from inner circumference wall surfaces of the core back portions to an inner direction in a diameter direction of the core back portions;
a stator which includes bobbins having an electric insulation capability, which are arranged at both end surfaces in a shaft direction of the stator core, and coils which are wound around the teeth via the bobbins; and
a rotor which is coaxially arranged at an inner circumference of the stator;
wherein the bobbins include coil winding portions, which are arranged at end surfaces in a shaft direction of the teeth, on which the coils are wound; flange portions, which are arranged at end surfaces in a shaft direction of the core back portions, at which a plurality of bus ring maintaining portions are separately formed in a diameter direction of the core back portions, each of the plurality of bus ring maintaining portions extending in the shaft direction and a circumference direction of the core back portions; and wall portions which are arranged in an inner direction in a diameter direction of the core back portions at the bus ring maintaining portions,
wherein a plurality of bus rings, which are concentrically arranged at the bus ring maintaining portions, include coil connecting portions which protrude in an outer direction in a shaft direction of the stator core with respect to the bus ring maintaining portions,
wherein terminals of the coils are bent in an outer direction in a diameter direction of the stator core at positions of end surfaces of the wall portions, and are connected to the coil connecting portions of the bus rings,
wherein the end surfaces of the wall portions protrude in an outer direction in a shaft direction of the stator core with respect to end surfaces of the bus rings, and are positioned in an inner direction in a shaft direction of the stator core with respect to end surfaces of the coil connecting portions, and
wherein boundaries of film exfoliations of the terminals of the coils are positioned in an outer direction in a shaft direction of the stator core with respect to the end surfaces of the wall portions of the bobbins.

4. A rotary electric machine as recited in claim 3, wherein a bend radius of the terminals of the coils is Rc, and an air distance, by which an insulation capability between the terminals of the coils and the other bus rings which are different from the bus ring to which the terminals of the coils are connected, is maintained, is Dv, and a distance Ds in a shaft direction between the end surfaces of the wall portions of the bobbins and the end surfaces of the bus rings is set as the following formula:

$$Ds \geq Dv - Rc.$$

5. A rotary electric machine as recited in claim 4, wherein the wall portions comprise protruding portions, about which the terminals of the coils are bent.

6. A rotary electric machine as recited in claim 3, wherein the wall portions comprise protruding portions, about which the terminals of the coils are bent.

7. A rotary electric machine comprising:
   a stator core which includes core back portions having an arc shape, and teeth which protrude from inner circumference wall surfaces of the core back portions to an inner direction in a diameter direction of the core back portions;
   a stator which includes bobbins having an electric insulation capability, which are arranged at both end surfaces in a shaft direction of the stator core, and coils which are wound around the teeth via the bobbins; and
   a rotor which is coaxially arranged at an inner circumference of the stator;
   wherein the bobbins include coil winding portions, which are arranged at end surfaces in a shaft direction of the teeth, on which the coils are wound; flange portions, which are arranged at end surfaces in a shaft direction of the core back portions, at which a plurality of bus ring maintaining portions are separately formed in a diameter direction of the core back portions, each of the plurality of bus ring maintaining portions extending in the shaft direction and a circumference direction of the core back portions; and wall portions which are arranged in an inner direction in a diameter direction of the core back portions at the bus ring maintaining portions,
   wherein a plurality of bus rings, which are concentrically arranged at the bus ring maintaining portions, include coil connecting portions which protrude in an outer direction in a shaft direction of the stator core with respect to the bus ring maintaining portions,
   wherein terminals of the coils are bent in an outer direction in a diameter direction of the stator core at positions of end surfaces of the wall portions, and are connected to the coil connecting portions of the bus rings,
   wherein the end surfaces of the wall portions protrude in an outer direction in a shaft direction of the stator core with respect to end surfaces of the bus rings, and are positioned in an inner direction in a shaft direction of the stator core with respect to end surfaces of the coil connecting portions, and
   wherein a bend radius of the terminals of the coils is Rc, and an air distance, by which an insulation capability between the terminals of the coils and the other bus rings which are different from the bus ring to which the terminals of the coils are connected, is maintained, is Dv, and a distance Ds in a shaft direction between the end surfaces of the wall portions of the bobbins and the end surfaces of the bus rings is set as the following formula:

$$Ds \geq Dv - Rc.$$

8. A rotary electric machine as recited in claim 7, wherein the wall portions comprise protruding portions, about which the terminals of the coils are bent.

* * * * *